United States Patent [19]

Tomlinson

[11] 4,237,966
[45] Dec. 9, 1980

[54] ENERGY CONSERVING HEATING AND AIR CONDITIONING SYSTEM

[76] Inventor: Joe W. Tomlinson, 12406 Foxburo, Houston, Tex. 77065

[21] Appl. No.: 6,019

[22] Filed: Jan. 24, 1979

[51] Int. Cl.³ .................. F23N 5/20; G05D 23/32
[52] U.S. Cl. ...................................... 165/12; 62/158; 236/46 R; 236/91 D
[58] Field of Search ............... 236/46 R, 91 D, 91 R; 62/157, 158, 231, 209; 165/12, 22

[56] References Cited

U.S. PATENT DOCUMENTS

| | | | |
|---|---|---|---|
| 3,051,451 | 8/1962 | Bierwirth et al. | 165/16 X |
| 3,677,335 | 7/1972 | Weatherston | 165/26 X |
| 3,882,928 | 5/1975 | Gazzo | 165/26 X |
| 3,964,677 | 6/1976 | Schalow et al. | 165/12 X |
| 3,979,060 | 9/1976 | Tierce | 165/12 X |
| 4,114,807 | 9/1978 | Naseck et al. | 165/16 X |

Primary Examiner—William E. Wayner
Attorney, Agent, or Firm—Neal J. Mosely

[57] ABSTRACT

An energy conserving system is disclosed for heating and air conditioning multi-zone structures such as multi-story office buildings.

A conventional heating and air conditioning system for a multi-story building has a central cooling unit for supplying chilled water for cooling and separately controlled fans or blowers for circulating cooled air in each story or zone. Separately controlled air heating (or reheating) means is provided for each story or zone. Usually the system is inactivated at night and on weekends in office buildings. When the system is inactivated, by-pass timers are provided to permit the system to be turned on in selected areas during off hours.

An energy conserving system (and method of operation) for the aforementioned heating and air conditioning system includes timing means operated sequentially at different periods of time which shut down the coolers prior to shutting down the blowers at the end of the day. In addition, timers are provided to inactivate selected blowers during selected periods of time. Suitable thermostatic controls are provided to activate and inactivate the system in accordance with predetermined outside and inside temperature values.

19 Claims, 3 Drawing Figures

4,237,966

ENERGY CONSERVING HEATING AND AIR CONDITIONING SYSTEM

BACKGROUND OF THE INVENTION

1. Field of the Invention

This invention relates to heating and air conditioning controls systems and more particularly to a system (and the method of operation thereof) for controlling the heating and/or air conditioning of a multi-zone or multi-story building in a manner achieving maximum efficiency.

2. Brief Description of the Prior Art

Thermostatic controls for controlling the heating and/or air conditioning systems of homes, offices, and other buildings to regular the temperature therein are well known. Likewise, it is well known to provide time controled devices to activate or inactivate heating and air conditioning systems at different periods of times.

Heating and air conditioning system for a multi-story office building has a central cooling unit for supplying chilled water for cooling and has separately controled fans or blowers for circulating cooled air in each story or zone. Separately controled air heating (or reheating) is provided for each story or zone. Thermostats may be provided for activating the fans or blowers and for activating the air heating (or reheating) means. Such a system may be inactivated at night and on weekends by manual controls or by suitable timers. When the system is inactivated, by-pass timers are provided to permit selected portions of the system to be turned on during off hours.

Bierwirth U.S. Pat. No. 3,051,451 discloses a thermostat and control circuit for a heating, air conditioning and ventilating system which is useful for multiple zones.

Weatherston U.S. Pat. No. 3,677,335 discloses a staged control system for heating and air conditioning. This system combines a certain timing and thermstatic control features.

Gazzo U.S. Pat. No. 3,882,928 discloses a multi-zone heating and cooling system for buildings.

Schalow U.S. Pat. No. 3,964,677 discloses an energy conserving thermostatic control for use with heating and/or air conditioning systems.

Naseck U.S. Pat. No. 4,114,807 discloses a power management system for controlling the operation of various stages within a multi-zone heating, ventilation, and air conditioning system.

SUMMARY OF THE INVENTION

An energy conserving system is disclosed for heating and air conditioning multi-zone structures such as multi-story office buildings and the like.

A conventional heating and air conditioning system for a multi-story office building has a central cooling unit for supplying chilled water for cooling and has separately controled fans or blowers for circulating cooled air in each story or zone of the building. Separately controled air heating (or reheating) means is provided for each story or zone of the building. Usually the system is inactivated at night and on weekends in office buildings. When the system is inactivated, by-pass timers may be turned on to permit the system to be activated in selected areas during off hours.

An energy conserving system (and method of operation) for the aforementioned heating and air conditioning system includes a pair of time clocks operated at sequential times to activate and deactivate the system. One time clock activates the system at a predetermined early morning hour and shuts down at a selected time in the afternoon or evening. The other time clock activates the system at a later hour in the morning and inactivates at a later time then the first time clock. This arrangement shuts down the coolers at a selected time but allows the air circulating blowers to function for a longer period. In addition, the system includes a plurality of timers arranged to inactivate selected blowers during selected periods of time. This system also includes a thermostat responsive to selected outside temperatures to activate the system independently of the time clocks and includes thermostats responsive to outside and inside temperatures to cause the system to function upon occurance of outside and inside temperatures above selected values. This system includes manual by-pass controls at various points to permit manual operation of the heating, cooling, and air circulating means independently of the thermostatic controls and the time clocks and timers.

BRIEF DESCRIPTION OF THE DRAWINGS

FIG. 1B is a wiring diagram for a control panel connected at selected points to the control circuits for the heating, ventilating, and air conditioning system shown in FIG. 1A.

DESCRIPTION OF THE PREFERRED EMBODIMENT

Figure 1A:
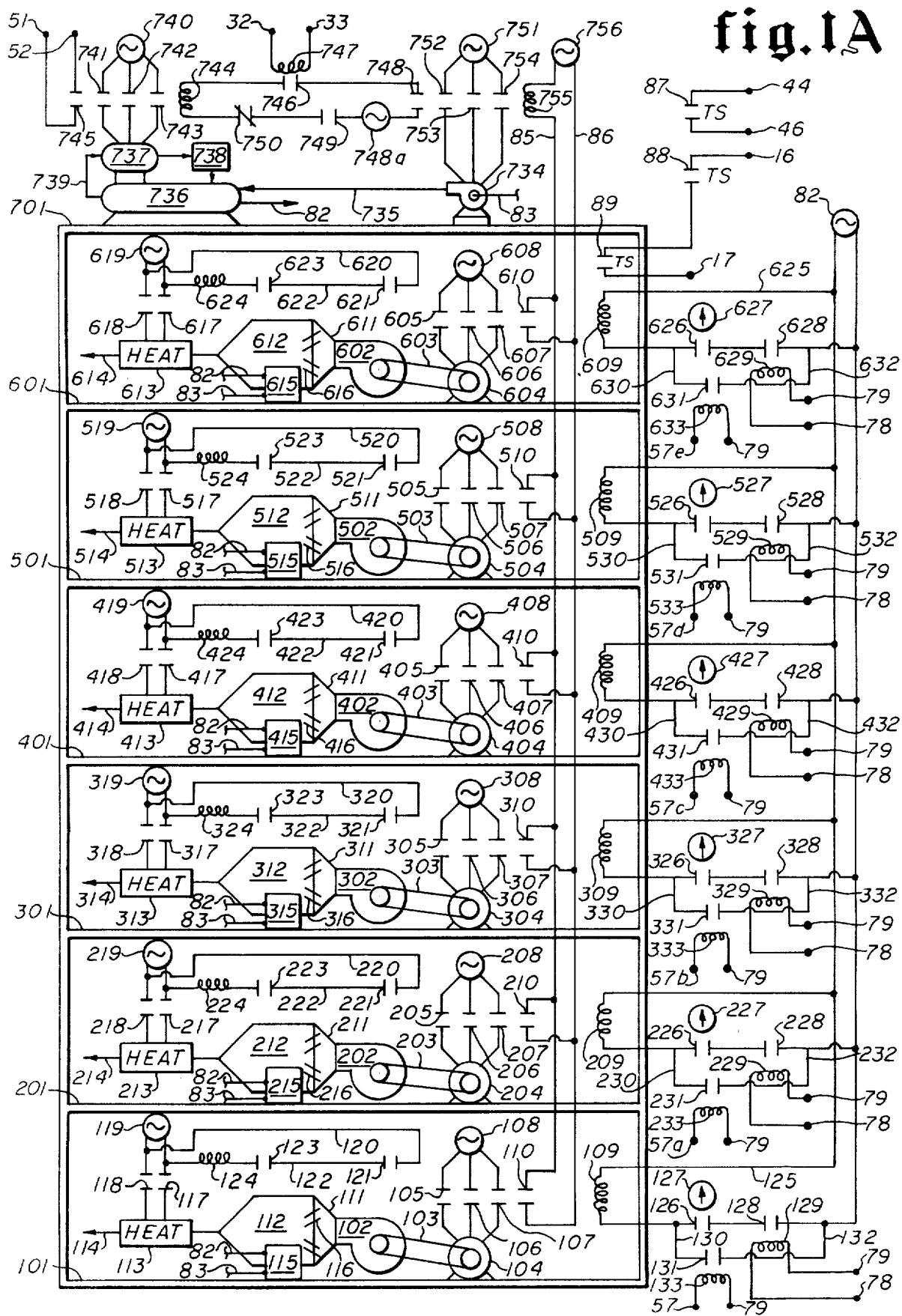
FIG. 1A is a schematic view of a building and the heating and air conditioning system therefor and a portion of the control circuits for such system.
Figure 2:
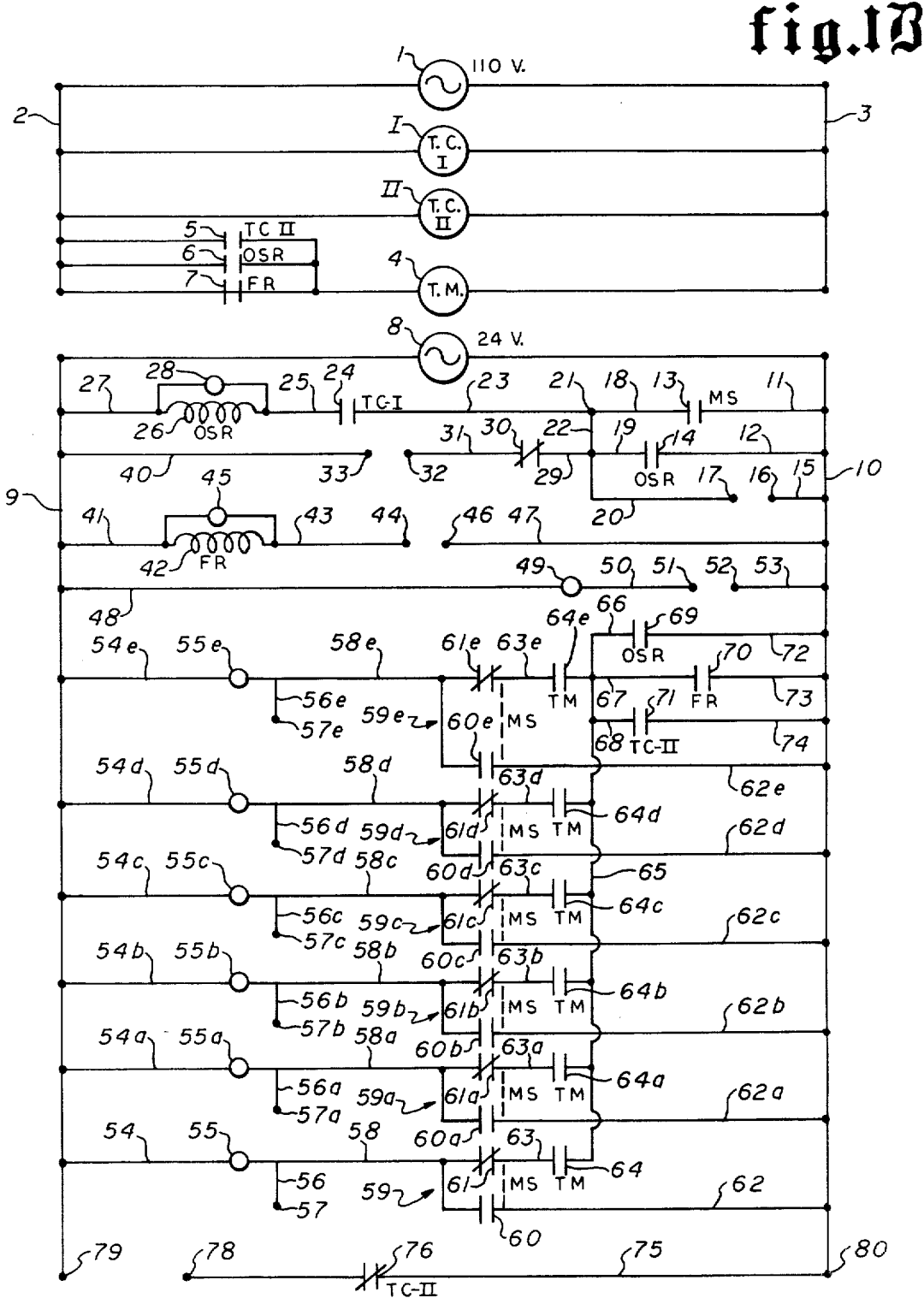
FIG. 2 is a legend of symbols used in the control circuit wiring diagram of FIGS. 1A and 1B.

Referring to the drawings, FIG. 1A includes a schematic view of a multi-zone or multi-story building and the heating, ventilating, and air conditioning system therefore. The drawing illustrates the system as applied to a six story building. Obviously, the system can be modified to accomodate a lesser or greater number of zones or stories in the building.

FIG. 1B illustrates schematically a control panel and the circuits therein for controlling the system of FIG. 1A. All of the circuitry would ordinarily be located within the structure of the building except for two exterior thermostats and some of the circuits associated with equipment which is shown to be located on the roof (preferably within a suitable enclosure.

Referring now to FIG. 1B, there is shown a control panel which has a line voltage circuit portion and a low voltage circuit portion. The line voltage circuit portion includes a source 1 of electric power, preferably 110 volts, connected to high voltage leads 2 and 3. Time clock I is connected to high voltage leads 2 and 3 and is preferably a 7-day time clock which can be set to activate various control circuits at selected times. Time clock II is similarly connected between high voltage leads 2 and 3 and is likewise preferably a 7-day time clock arranged to activate control circuits at selected times. Time clock I operates one pair of contacts in a circuit to be described later. Time clock II operates three pairs of switch contacts in circuits which will be described later. The final portion of the high voltage circuit includes timing motoring 4 which is connected on one side to high voltage lead 3 and is connected on the other side to switch contacts 5 for time clock II and to relay contacts 6 and 7. Switch contacts 5, 6, and 7 are connected in parallel to high voltage lead 2.

The low voltage panel circuit is preferably one having a low voltage source of electric power 8, preferably 24 volts. The low voltage source of power is shown to be independent of the high voltage power but could, if desired, be provided by a transformer connected in the high voltage circuit. Low voltage power source 8 is provided with low voltage control circuits. The first control circuit in the low voltage section controls manual startup and separately controls optimal startup by the co-action of the time clocks and certain thermostats. This control circuit includes leads 11 and 12 connected from lead 10 to one side of initially open switch contacts 13 and 14, respectively. Switch contacts 13 are the contacts of an initially open manually operated switch, preferably a momentary make, push button switch, on the control panel. Switch contacts 14 are the initially open relay contacts of an optimal start relay, the function of which will be described hereinafter. Electric lead 15 is connected to terminal 16 which is connected, in turn, to a point in the control circuit shown in FIG. 1A to be subsequently described. Another terminal 17 is provided which is likewise connected to a point in the control circuit of FIG. 1A. The other side of switches 13 and 14 and terminal 17 are connected by leads 18, 19, and 20, respectively, to terminal points 21 and 22 which are connected in parallel, as illustrated. Terminal point 21 is connected by lead 23 to one side of initially open contacts 24 which are operated by time clock I. The other side of open contacts 24 is connected by lead 25 to one side of optimal start relay coil 26, the other side of which is connected by lead 27 to low voltage lead 9. Pilot light 28 is connected in parallel to relay coil 26 and is lit when relay coil 26 is energized. Terminal 22 is connected by lead 29 to one side of an initially closed, manually operated switch 30, the other side of which is connected by lead 31 to terminal 32. Terminal 33 is connected by lead 40 to low voltage lead 9. Terminals 32 and 33 are connected in the control circuit of FIG. 1A in a manner to be subsequently described.

The next portion of the panel circuits is the freeze protection circuit. This circuit consists of lead 41 connected from low voltage lead 9 to one side of freeze relay coil 42. The other side of freeze relay coil 42 is connected by lead 43 to terminal 44. Pilot light 45 is connected in parallel around freeze relay 42 and is lit when relay 42 is energized. Terminal 46 is connected by lead 47 to low voltage lead 10. Terminals 44 and 46 are connected in the circuit of FIG. 1A in a manner to be subsequently described.

The next portion of the panel control circuits is an alarm circuit. This circuit consists of lead 48 connected from low voltage lead 9 to pilot light 49. The other side of the pilot light 49 is connected by lead 50 to terminal 51. Terminal 52 is connected by lead 53 to low voltage lead 10. Terminals 51 and 52 are connected in the control circuit of FIG. 1A in a manner to be subsequently described.

The next portion of the panel circuits consists of a plurality of circuits arranged in parallel to control the circuits to the individual blowers on the different floors or different zones of the building illustrated schematically in FIG. 1A. A plurality of parallel circuits comprise leads 54, 54A, 54B, 54C, 54D, and 54E connected from low voltage lead to one side of pilot lights 55, 55A, 55B, 55C, 55D, and 55E. The other sides of the several pilot lights 55-55E are connected by leads 56, 56A, 56B, 56C, 56D, and 56E to terminals 57, 57A, 57B, 57C, 57D, and 57E, respectively. The several terminals 57-57E are connected in circuits shown in FIG. 1A and the other side of those circuits is connected back to low voltage lead 10 as at terminal 80. The several pilot lights 55-55E are also connected by leads 58-58E to switches 59-59E respectively. Switch 59 is a single pole double throw switch with contacts 60 being initially open and contacts 61 initially closed. Switches 59-59E are similarly single pole double throw switches having open contacts 60A-60E and close contacts 61A-61E, as shown. The initially open contacts 60-60E of switches 59-59E are connected by leads 62-62E to low voltage lead 10. The initially closed contacts 61-61E of switches 59-59E are connected by leads 63-63E, respectively, to one side of timing motor switches 64-64E, respectively. The other side of the timing motor switches is connected by common lead 65 to parallel leads 66, 67 and 68 to one side of initially open switch contacts 69, 70 and 71. The other side of switches 69, 70 and 71 is connected by leads 72, 73 and 74 to low voltage lead 10. Switch contacts 69 are the initially open contacts of the optimal start relay and are controled by relay coil 26. Initially open contacts 70 are the contacts of the freeze relay and are operated by relay coil 42 which is controled by a freeze thermostat in the circuit to be described in connection with FIG. 1A. The initially open switch contacts 71 are operated by time clock II.

The last portion of the low voltage circuits is a by-pass timer lockout circuit. This circuit comprises lead 75 connected to low voltage lead 10 and to one side of initially closed switch 76 which is arranged for operation by time clock II. The other side of switch 76 is connected by lead 77 to terminal 78. Lead 9 of the low voltage circuit ends with a terminal 79. Terminal 78 and 79 are arranged to be connected in a by-pass timer lockout circuit in the control circuits shown in FIG. 1A.

In FIG. 1A of the drawings, there is shown a schematic view of a six-story building and a heating, ventilating, and air conditioning system therefore. There is also shown a control sytem comprises a plurality of circuits controlling the various components of the heating, ventilating and air conditioning system. Terminals which have the same reference numerals as occur in FIG. 1B represent those same points of electrical connection and those represent the point at which the circuits in FIG. 1A are connected to the circuits in FIG. 1B.

In FIG. 1A, there is shown a building 81 having a first floor 101, a second floor 201, a third floor 301, a fourth floor 401, a fifth floor 501, a sixth floor 601, and a roof 701. In floors 1 through 6 of building 81, the equipment used is substantially identical and each of the several parts or components has the same reference numeral with the initial part of the numeral indicating the floor of the building.

On the first floor 101, of building 81 there is shown a high capacity blower 102 connected by pully 103 or other suitable drive to electric motor 104. Motor 104 is connected to initially open relay switch contacts 105, 106 and 107 which are in turn connected to a three-phase electric power source 108. Switch contacts 105, 106 and 107 are relay contacts operated by relay coil 109. Switch contacts 110 are also arranged for operation by relay coil 109 to control another circuit.

Blower 102 is arranged to discharge air into chamber 111. Chamber 111 opens into chamber 112 which discharges to electrically controled heater 113 which in turn discharges as indicated at 114 to air conduits circulating air to the rooms on the floor. At the lower portion of chamber 112 there is provided cooling means 115 consisting of a cold water cooling coil supplied by conduits 82 and 83 leading to the inlet and outlet respectively of a water cooling system located on the roof. A plurality of baffles are provided between air chamber 111 and air chamber 112 in cooling coil 115 to shift the flow of air through or around the cooling coil to adjust the temperature of cooled air emitted from the equipment. Electric heater 113 provides for reheating overly cooled air or for heating ambient air in periods of cold weather. Baffles 116 may be arranged for manual adjustment or may be thermostatically adjusted by any suitable thermostatically operated means. Electrically controled heater 113 may be an electric heater or may be any other type of heater having electrical controls for energizing the same. The electric control circuit extends to relay contacts 117 and 118 which are initially open and which are provided with power from a suitable electric power source 119. Power source 119 is also connected by lead 120 to one side of thermostat 121. The other side of thermostat 121 is connected by lead 122 to one side of initially open switch 123. Switch 123 is a sail switch which responds to air movement and is closed by movement of air effected by blower 102. The other side of switch 123 is connected to relay coil 124 which in turn is connected back to the other side of electric power source 119. The circuit for relay coil 124 is energized when the temperature drops and thermostat 121 closes, provided that sail switch 123 is also closed by movement of air by blower 102. Energization of coil 124 causes switch contacts 117 and 118 to close and energize the electric heater or (reheater) 113.

The blower, motor, cooler, and heater, and the control circuitry therefore is identical for each of the floors 2 through 6 and the various components have the same reference numerals with the initial numeral indicating the floor on which the equipment is located. The only exception to this numbering scheme is that the same numerals are used for the conduits or pipes carrying the chilled water to and from the cooling unit on the roof.

By-pass timer control circuits for energizing the system on selected floors or selected zones is provided with a suitable electric power source 82 provided with electric leads 83 and 84 leading to various control circuits. On the first floor, lead 83 is connected by lead 125 to one side of relay coil 109. The other side of relay coil 109 is connected to one side of initially open switch contacts 126 which are arranged to be operated by by-pass timer 127. The other side of initially open contacts 126 is connected to one side of initially open relay contacts 128 the other side of which is connected to electric lead 84 returning to electric power source 82. Relay contacts 128 are initially open and are controled by relay coil 129 which is connected to terminal 78 and 79 on the control panel and controled by switch 76 operated by time clock II. Lead 130 connects from a point between relay coil 109 and switch contacts 26 to one side of initially open relay contacts 131. The other side of relay contacts 131 is connected by lead 132 to lead 84 returning to electric power source 82. Switch contacts 131 which are initially open are therefore arranged in parallel with contacts 126 and 128. Relay contacts 131 are actuated by relay coil 133 which is connected to terminals 57 and 79 on the control panel and are controled by the circuits associated with those terminals.

The circuits associated with the by-pass timer are identical on each of the several floors and the various components are given identical reference numerals with the initial numeral indicating the floor. The only exception to this is that the same numerals are given for the terminal points of connection to the control panel shown in FIG. 1B.

On the roof 701 (and preferably enclosed) there is provided a cooling system for supplying chilled water to the cooling coils in the cooling units for the blowers on each of the separate floors. This system includes a pump 734 having an inlet conduit 83 connected to the corresponding return lines from the various cooling coils on each of the several floors. Pump 734 discharges through line 735 to the inlet side of a chiller unit 736. The chiller 736 has outlet conduit 82 connected to the inlet to the various chilled water coils on each of the several floors. Chiller unit 736 includes the evaporator coils (not shown) for a refrigeration system. Refrigeration system includes compressor 737 which discharges to condensor 738 which discharges to the evaporator coils in chiller 736 from which the refrigerant passes back through line 739 to compressor 737. The motor for compressor 737 is preferably supplied by a three-phase electric power source 740 which is controlled by switch contacts 741, 742, and 743 controled by relay coil 744. Relay coil 744 is also arranged to control switch contacts 745 which are connected to terminal points 51 and 52 on the control panel to activate pilot light 49 which indicates whether the compressor circuit is energized. Relay coil 744 is connected to one side of initially open relay switch contacts 746. Switch contacts 746 are controlled by relay coil 747 which is connected to terminal connections 32 and 33 on the control panel. Relay contacts 746 are connected to one side of relay contacts 748 the other side of which is connected to flow switch 749. Flow switch 749 is connected to one side of initially closed thermostat 750, the other side of which is connected back to relay coil 744. This circuit is energized by A.C. power source 748 a.

Pump 734 is preferably driven by a three-phase electric motor which is provided with electric power from power source 751 which is connected through initially open relay contacts 752, 753, and 754. Relay contacts 748, 752, 753 and 754 are controled by relay coils 755 which is connected to power source 756. The other side of relay coil 755 is connected to lead 85 which is connected to one side of the relay contacts 110–610. The other side of relay contacts 110–610, respectively, is connected to lead 86 which is connected back to power source 756. Relay coil 755 is therefore controled by relay contacts 110–610, which are connected in parallel.

The circuits in FIG. 1A also include certain thermostatic controls which affect the operation of the control panel. Thermostatic switch 87 is connected to terminals 44 and 46 on the control panel. Thermostatic switch 87 is a freeze switch which is set to close when the temperature drops to 32° F. or lower. A pair of thermostats 88 and 89 are connected in series and are in turn connected to terminal points 16 and 17 on the control panel. Thermostat 88 is closed at temperatures above 40° F. and open at temperatures below that value. Thermostat 89 closes at 72° F. and opens upon fall of temperature. Thermostat 88 is located outside the building and acts as a low limit to prevent automatic operation of the system when the outside temperature is set below the thermostat setting. Thermostat 89 is located inside the building and is preferably placed on the top floor on the east side where it will receive some solar influence. It is preferably pre-set a few degrees above the space control thermostat setting, e.g. 72° F.

OPERATION

The apparatus described above is for a six-story office building. This is for illustrative purposes only. The system is designed for use in any multi-story or multi-zone office building or other type of building where the system is turned off during the night and on weekends. The various controls for the different zones or stories of the building are in parallel and additional control and operating circuits can be added or deleted as desired. While it might be economically unfeasible, the system can even be used in a single story or single zone operation.

The heating, ventilating and air conditioning system illustrated in most of FIG. 1A is a relatively conventional system for use in an office building or the like having multiple zones or stories. When the system is activated the heater circuits are controled by the thermostats 121-621 provided that air is flowing and sail switches 123-623 are closed. Since these control circuits on different floors are completely independent, the heater circuits can be energized on demand by the respective thermostats. The blower circuits are controled on the respective floors by relay coils 109-609 which control switch contacts 110-610, respectively. This provides for independent control in the starting and stopping of the respective blower. When the blowers are operating, relay coil 755 is energized on the roof which closes the switch contacts providing for circulation of chilled water. When relay coil 755 is energized switch contacts 748 are also closed which provide for part of the control to the refrigeration portion of the system. If the temperature of the circulating water is above the setting of thermostat 750, that switch remains closed. Circulation of water by pump 734 will cause flow switch 749 to close. At that point, relay coil 744 will be energized provided that relay coil 747 has been energized close switch contacts 746. Relay coil 747 is energized at any time that one or more of the manual or optimal start circuits is complete. Energization of relay coil 744 causes switch contacts 741, 742 and 743 to energize compressor 737 and causes relay contact 745 to close to energize signal light 49.

The system which is operated through the control panel shown in FIG. 1B is controled to a large extent by time clock I and time clock II. Time clock I is preferably arranged to start at an early hour in the morning by closing the contacts operated by that clock. Time clock I maintains the switch contacts which it controls closed during its normal period of operation. Time clock I closes its contacts at an early hour in the morning and allows those contacts to open at a selected time in the afternoon or evening. Time clock II closes its contacts at a selected hour later in the morning and opens those contacts at a selected hour later in the afternoon or evening.

When time clock I closes its contacts 24 early in the morning, the system may commence operating provided that optimal start conditions have occurred. Optimal start is controled by the two adjustable thermostats 88 and 89 which are connected in series. Thermostat 88 is positioned outside the building and acts as a low limit. The cooling function will not operate below this pre-set temperature. The other thermostat is placed on the top floor of the building, preferably on the east side where it will receive solar infuence. This thermostat 89 is pre-set a few degrees above the space control thermostat setting. When both thermostats are closed, i.e. when the outside and the inside temperatures are above the thermostat settings, and switch contacts 24 (operated by time clock I) are closed, optimal start relay 26 is energized. This will close relay contacts 14 and lock this circuit in operation until contacts 24 open at the end of the day. Pilot light 28 indicates that this circuit is in operational.

If optimal start conditions have not occurred in the morning and there is a demand for cooling by building occupants, the system can be started by closing manual switch 13. When the start circuits are energized, relay coil 747 is energized and the refrigeration portion will operate on demand of the chilled water thermostat 750 provided that water is circulating as indicated by flow switch 749.

At a pre-set time, time clock II will turn on and causes switches 5 and 71 to close and switch 76 to open. The closing of switch 5, operated by time clock II, or switch 6, operated by relay 26, or switch 7, operated by the freeze relay coil 42 will cause timer motor 4 to be energized. The function of the timer motor will be described more fully hereinafter. When time clock II turns on, switch contacts 5 will start timer motor 4 if neither of the other switches are closed. Switch contacts 71 will close and complete the circuit controlling relay coils 133-633 which control relay coils 109-609 controlling the starting of blowers 104-604. When time clock II has operated, the blowers may start up with heating capabilities if the thermostats in the spaces are calling for heat. At this phase in the operation cooling can be initiated either by occurrence of the aforementioned optimal start conditions or by closing manual switch 13. During the period of time that time clock II is in operation switch contacts 76 are opened and relay coils 129-629 are deenergized and prevent activation of the blower control circuits by the by-pass timers 127-627. It should be noted that during off hours operation when time clock II has closed contacts 76, by-pass timers 127-627 can be individually operated to close switch contacts 126-626 and energize the respect blowers. The by-pass timers, however, will not cause the cooling function to operate unless the optimal start conditions have been met by thermostats 88 and 89.

The system can also be initially activated by freeze control thermostat 87 which closes when the temperature drops below a pre-set value, e.g. 32° F. When this thermostat closes, relay coil 42 is energized and freeze relay switch contacts 7 and 70 are closed which allow the system to operate.

During the time that the system is operating, timer motor 4 operates on a 15-minute cycle. Timer motor 4 actuates the individual switch contacts 64-64E to close said contacts for a pre-set period during each 15-minute cycle. The length of time that these switch contacts are closed is pre-set but may be readjusted for any period of time. The timer motor switch contacts 64-64E, respectively, are preferably set to be opened and closed at different times within the 15 minute cycle of the timer motor 4 with the result that the control circuits for the individual blowers are turned off for a selected time every 15 minutes. Switches 59-59E can be individually activated to turn individual blower circuits to a permanently on condition by-passing the timer motor switch contacts. Alternatively, individual ones of the switches 59–59E may be moved to an intermediate position with both switch contacts 60 and 61 open to inactivate a particular blower circuit for servicing.

The various pilot lights on the control panel indicate which portions of the system are in operation. Thus, pilot light 28 indicates the occurrence of optimal start conditions. Pilot light 45 indicates the occurrence of freeze conditions outside the building. Pilot light 49 indicates which of the refrigeration compressor is operating (in a system utilizing more than one compressor). Pilot lights 55–55E, respectively, indicate which of the blower circuits is in operation.

The control panel is provided with several manual controled switches as discussed above in describing the construction of the apparatus. Manual switch 13 permits the startup of the system when optimal start conditions have not occurred provided that time clock I has closed its contacts 24. Manual switch 30 provides for manual shut down of the refrigeration compressor control circuit. Manual switches 59–59E, respectively, permit the individual blower control circuits to be turned off completely or to be turned on permanently, thus by-passing the timer motor control switch contacts. The by-pass timers 127–627, respectively, are manual-time controled switches which permit operation of the system for select periods of time during off hours when the main system controls are shut down.

At a pre-set time, preferably late in the afternoon or early evening, time clock I turns off switch contacts 24. This inactivates the circuit to the refrigeration compressor and causes the refrigeration function to shut down. The control circuits for the air blowers, however, remain operative until the switch contacts 71 operated by time clock II are opened at a selected later hour.

The control panel and the circuits associated therewith and the circuit connections into the control circuits shown in FIG. 1A represent additional control circuits superimposed on existing multi-story air conditioning control systems. As noted above, most of the apparatus and the control circuits therefore shown in the structure of building 81 represent existing, more or less conventional, equipment in multi-story office buildings. The additional controls provided by the control panel and the circuit inter-connections between the panel and the air conditioning system permits the operation of the air conditioning system with a high degree of energy economy. The system can be operated during off hours by the by-pass timer controls which permit the blowers and the heater circuits to function. During this period, the air conditioning functions come on only if the optimal start thermostats 88 and 89 require air conditioning. The system permits the air conditioning to be turned on permanently in selected areas, e.g. a computer room, wherever needed. The dual time clock arrangement provides for the start up of the system at an early hour in the morning and a shut down of the system at a selected hour in the afternoon or evening. The time clocks are 7-day clocks and can be set to come on and go off at different times on different days. This permits variations in the cycle as a result of changes in the weather and permits the equipment to be activated at an earlier hour or Sunday night or Monday morning to start the air conditioning functioning after a weekend shut down. The dual time clock arrangement also provides for the shut down of the refrigeration equipment some selected time prior to the shut down of the blowers at the end of the working day. The result of this arrangement is that the last period of the day, following the opening of switch contacts 24 by time clock I, is a time when the refrigeration equipment is not working but the cooling continues by means of the cooled water which is still circulating in the system.

The combination of the timing features and the shut down of the refrigeration equipment a selected time prior to the shut down of the blowers at the close of the day results in a very substantial energy savings in the operation of the building heating, ventilating and air conditioning system. In fact, in actual building installations where this equipment has been installed, energy savings in the range of 10–25% have been obtained.

It should be understood that the foregoing description of the construction and of the operation of the equipment as shown in the drawings is only illustrative of the inventive concept. As noted before, the system may be used in any multi-zone or multi-story building, and, if desired, it could even be used in a single zone or single story building. The control panel and the circuit inter-connections to the main heating, ventilating and air conditioning control system is shown for a particular conventional heating, ventilating and air conditioning control system. It will be obvious to those skilled that the control panel and the system interconnections can be adapted to the control of other heating, ventilating and air conditioning systems without departing from the scope and intent of this invention. There are many of the features shown in the system that are merely illustrative of a normal control system and could be varied if desired. Obviously, single phase motors could be used at various points in the equipment and the control system changed accordingly. Likewise, the system allows for additional control features, such as the control of dampers 116–616 by a thermostatic control or the control of the flow of cooling water through conduits 82 and 83 by thermostatic means.

Accordingly, it should be understood that within the scope of the appended claims this invention may be practiced otherwise than as specifically described herein.

I claim:
1. A control system for office building air conditioning equipment comprising heating, ventilating and refrigerating apparatus having separate electric circuit means controlling the heating, ventilating and refrigerating components comprising first circuit means adapted to be operatively connected to and controlling energization of said refrigerating and said ventilating circuit means, second circuit means adapted to be operatively connected to and controlling energization of said ventilating circuit means, first time controlled switch means positioned in said first circuit means operable to be closed at a selected hour in the A.M. to place said refrigerating and said ventilating circuits in condition for operation and operable to be opened at a selected hour in the P.M. to inactivate said refrigerating and said ventilating circuits, second time controlled switch means positioned in said second circuit means operable to control the same to control operation of said ventilating circuit means independently of said first circuit means and said second time controlled switch means being operable to be closed at a selected later hour in the A.M. and opened at a selected later hour in the P.M. than said first time controlled switch means whereby said ventilating circuit means is operable to remain energized for a selected time after deenergization of said refrigerating circuit means.

2. A control system according to claim 1 including a third time controlled switch means positioned in said second circuit means and operable to inactivate said ventilating circuit means at selected times during the period that said second circuit means is activated by closure of said second time controlled switch means.

3. A control system according to claim 1 including thermostatic switch means positioned in said first circuit means and responsive to outside and inside temperatures to activate said first circuit means when the outside and inside temperatures are both above predetermined values during the time said first circuit means is activated by closure of said first time controlled switch means.

4. A control system according to claim 1 in which said first circuit means includes thermostatic switch means positioned outside and operable to be closed to activate said first circuit means upon occurrence of a temperature below a predetermined value.

5. A control system according to claim 1 in which the ventilating control circuit includes by-pass time controlled switch means operable to activate said ventilating control circuit means for selected periods of time when the control system is otherwise inactivated by opening of said first and said second time controlled switch means.

6. A control system according to claim 5 in which said second time controlled switch means includes initially closed contacts which are opened upon closure of said second time controlled switch means and which are positioned to inactivate the control of said ventilating control circuit means by said by-pass time controlled switch means during the period that said second time controlled switch means is closed.

7. A control system according to claim 1 including manually operated switch means positioned in at least one of the circuits to permit manual activation and de-activation thereof.

8. A control system according to claim 1 including an electric pilot light positioned in at least one of said circuit means to indicate when said circuit means is activated.

9. A control system according to claim 1 in which said heating, ventilating and refrigerating equipment is for a multistory building and includes separate ventilating means for each story having separate electric circuit means therefore, and said first circuit means and said second circuit means being adapted to be operatively connected to and control energization of each of said separate ventilating electric circuit means.

10. A control system according to claim 9 in which said second circuit means includes a plurality of parallel circuit means adapted to be connected to each of the respective circuit means controlling ventilating components on the respective stories of the building,
third time controlled switch means positioned one in each of said parallel circuit means and operable to inactivate individual ventilating circuit means for separate stories of the building at selected times during the period that said second circuit means is activated by closure of said second time controlled switch means.

11. A control system according to claim 10 including thermostatic switch means positioned in said first circuit means and responsive to outside and inside temperatures to activate said first circuit means when the outside and inside temperatures are both above predetermined values during the time said first circuit means is activated by closure of said first time controlled switch means.

12. A control system according to claim 10 in which said first circuit means includes thermostatic switch means positioned outside and operable to be closed to activate said first circuit means upon occurence of a temperature below a predetermined value.

13. A control system according to claim 10 in which each of said ventilating control circuit means includes by-pass time controlled switch means operable to activate selected ventilating control circuit means for selected periods of time when the control system is otherwise inactivated by opening of said first and said second time controlled switch means.

14. A control system according to claim 13 in which said second time controlled switch means includes initially closed contacts which are opened upon closure of said second time controlled switch means and which are positioned to inactivate the control of said ventilating control circuit means by said by-pass time controlled switch means during the period that said second time controlled switch means is closed.

15. A control system according to claim 10 in which
said third time controlled switch means includes an electric timing motor and circuit means to energize the same and a plurality of separate switch contacts positioned in each of said parallel circuit means,
said second time controlled switch means includes an electric timing motor and circuit means to energize the same and a plurality of separate switch contacts,
said first time controlled switch means includes electric timing motor and circuit means to energize the same and a plurality of separate switch contacts.

16. A control system according to claim 15 in which
said first circuit means includes a first relay coil and a plurality of switch contacts operated thereby,
first thermostatic switch means positioned in said first circuit means in series with said first relay coil,
said first thermostatic switch means including means responsive to temperatures both inside and outside the building and having switch contacts closed when the inside and outside temperatures are both above predetermined values,
said first circuit means including initially open contacts operated by said first relay coil positioned in series with said first relay coil and in parallel with said first thermostatic switch means,
said second circuit means including a second relay coil and a plurality of switch contacts operated thereby, second thermostatic switch means having initially open switch contacts positioned in said second circuit means and operable to be closed in response to decrease in outside temperatures below a predetermined value, the circuit means for the timing motor of said third time controlled switch means including in series therewith and in parallel with each other initially open contacts operated by said second time controlled switch means and initially open contacts of said first and said second relay coils, and
the initially open contacts of said third time controlled switch means being positioned in said second circuit means in series with switch contacts connected in parallel with each other, said last named switch contacts being initially open contacts being operated respectively by said second time controlled switch means, said first relay coil and said second relay coil.

17. A control system according to claim 16 including a plurality of manually operated switches positioned in selected circuits to permit activation thereof independently of the operation of the various automatically operated switched controlling said circuits.

18. A method of operating an air conditioning system for a building which system includes heating, ventilating and refrigerating apparatus and electric circuits controlling the operation of the same, which comprises activating circuits controlling ventilating and refrigerating apparatus at a selected hour in the A.M., said circuits being subject to control by thermostatic means, activating circuits controlling ventilating apparatus at a selected later hour in the A.M., said last named circuit activation being independent of said first named activation, deactivating circuits controlling said refrigerating apparatus at a selected hour in the P.M., and deactivating circuits controlling said ventilating apparatus at a selected later hour in the P.M.

19. A method according to claim 18 which includes activating and deactivating said ventilating apparatus for selected times during the period that the same is otherwise activated by said first named and second named activation steps.

* * * * *